United States Patent
Gunlogson et al.

(10) Patent No.: US 9,854,725 B2
(45) Date of Patent: Jan. 2, 2018

(54) LASER GUIDANCE SYSTEM FOR AGRICULTURAL OPERATIONS

(71) Applicant: CNH Industrial America LLC, New Holland, PA (US)

(72) Inventors: Matt Gunlogson, Benson, MN (US); Martin Krohn, DeGraff, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/082,587

(22) Filed: Mar. 28, 2016

(65) Prior Publication Data

US 2017/0273232 A1 Sep. 28, 2017

(51) Int. Cl.
| | | |
|---|---|---|
| *A01B 69/00* | (2006.01) | |
| *A01B 79/00* | (2006.01) | |
| *A01C 23/00* | (2006.01) | |
| *A01M 7/00* | (2006.01) | |
| *A01F 15/08* | (2006.01) | |
| *G05D 1/02* | (2006.01) | |

(52) U.S. Cl.
CPC .......... *A01B 69/001* (2013.01); *A01B 79/005* (2013.01); *A01C 23/008* (2013.01); *A01F 15/08* (2013.01); *A01M 7/005* (2013.01); *G05D 1/0259* (2013.01); *G05D 2201/0201* (2013.01)

(58) Field of Classification Search
CPC .................. A01B 69/001; A01B 69/00; G05D 2201/0201; G05D 1/024; E01C 19/006
See application file for complete search history.

(56) References Cited

U.S. PATENT DOCUMENTS

| | | | | |
|---|---|---|---|---|
| 1,853,253 A | * | 4/1932 | Bennett ................ | A01D 87/122 198/310 |
| 3,496,662 A | * | 2/1970 | Choate ...................... | G09F 9/30 359/288 |
| 4,225,226 A | | 9/1980 | Davidson et al. | |
| 4,288,943 A | | 9/1981 | Ptaszek et al. | |
| 4,470,670 A | * | 9/1984 | Ingle .................... | B23K 20/004 228/56.5 |
| 4,706,773 A | * | 11/1987 | Reinaud ............... | A01B 69/001 172/5 |
| 4,978,246 A | | 12/1990 | Quenzi et al. | |
| 5,050,771 A | | 9/1991 | Hanson et al. | |
| 5,278,423 A | | 1/1994 | Wangler et al. | |

(Continued)

OTHER PUBLICATIONS

Laserline MFG, Inc; GL3000PMC Wing-Tow Plow Guidance Laser; Product Catalog from Web-Site (www.laserlinemfg.com/index.php/products/wing-plow-guidance-laser); pp. 1-7; Aug. 2015, US.

*Primary Examiner* — Bryan Evans
(74) *Attorney, Agent, or Firm* — Rebecca L. Henkel; Rickard K. DeMille

(57) ABSTRACT

The present invention provides an improved mechanism for centering implements in agricultural fields by providing a laser guidance system with a laser attached to the implement. The laser may operate to emit a beam in order to produce a spot or beam onto the field which an equipment operator may visually target to improve steering of the implement. The laser may be centered on the implement, and the beam produced by the laser may be directed forward within a steering range of the implement and within a field of view of the equipment operator.

17 Claims, 3 Drawing Sheets

(56) References Cited

U.S. PATENT DOCUMENTS

| | | | |
|---|---|---|---|
| 5,285,205 A | 2/1994 | White | |
| 5,476,147 A | 12/1995 | Fixemer | |
| 6,095,254 A | 8/2000 | Homburg | |
| 6,236,916 B1 | 5/2001 | Staub et al. | |
| 6,389,785 B1 * | 5/2002 | Diekhans | A01B 69/001 172/4.5 |
| 6,736,216 B2 | 5/2004 | Savard et al. | |
| 7,364,096 B1 * | 4/2008 | Sosnowski | A01C 23/008 239/166 |
| 8,271,164 B2 | 9/2012 | Melanson et al. | |
| 8,482,736 B2 | 7/2013 | Franzen et al. | |
| 8,590,167 B2 | 11/2013 | Odom | |
| 9,026,315 B2 | 5/2015 | Anderson | |
| 2003/0020007 A1 | 1/2003 | Andersen | |

* cited by examiner

LASER GUIDANCE SYSTEM FOR AGRICULTURAL OPERATIONS

FIELD OF THE INVENTION

The present invention relates generally to agricultural implements, and in particular, to implements including a laser guidance system with a laser configured to emit a beam in a direction outward from the implement within a steering range of the implement.

BACKGROUND OF THE INVENTION

Many operations in agricultural fields require an equipment operator to guide an agricultural implement, such as, a sprayer, planter, baler, or the like, along the agricultural field. Such operations may include, for example: guiding an implement along rows of crops, such as for spraying herbicides, insecticides and/or fertilizers; guiding an implement along windrows (or rows of cut or mowed crops), such as for baling operations; guiding an implement along furrows, such as for planting seeds; and so forth. Care must ordinarily be taken to center the implement on the agricultural field so as to avoid wasteful overlap between passes, incomplete baling, producing non-uniform bales, running, over crops and/or damaging crops. Consequently, travel speeds are often reduced in order to effectively maintain such centering, which thereby increases operating time in the field, resulting in lost productivity.

SUMMARY OF THE INVENTION

The present invention provides an improved mechanism for centering implements in agricultural fields by providing a laser attached to the implement. The laser may operate to emit a beam in order to produce a beam or spot onto the field which an equipment operator may visually target to improve steering of the implement. The laser may be centered on the implement, and the beam produced by the laser may be directed forward within a steering range of the implement and within a field of view of the equipment operator. The beam may be emitted to produce a single spot on the field, or alternatively, the beam could be emitted to, produce a continuous straight line along the field, similar to a line level laser (or laser line generator) for establishing level or plumb reference lines.

Accordingly, the laser may be centered, for example: between rows of crops, such as for guiding an implement for spraying herbicides, insecticides and/or fertilizers; along windrows, such as for guiding an implement, from side to side for baling operations to produce a uniform bale; along furrows, such as for guiding an implement for planting seeds; and so forth. As a result, an equipment operator may visually target the beam or spot produced by the laser to center the implement, thereby allowing increased travel speeds and a reduction of operating time in the field.

In one aspect, a laser may be radiated ahead of an implement, such as a sprayer. An operator of the implement may direct the implement so that the beam is properly placed on a target. In the case of a sprayer, proper placement of the laser could be the center between two agricultural rows when the laser where the beam is transmitted from is at the center of the sprayer. Moreover, the beam might be placed at the center and ahead of a tire so that the operator can guide the tire in a proper direction. In the case of a baler, a beam might be positioned ahead of the pickup so that an operator may guide the baler down the windrow. The beam might also be used to control the position of the windrow to the pickup so a round bale may be evenly developed. Numerous options may be provided within the scope of the invention.

Specifically then, one aspect of the present invention provides an implement for agricultural operations including: a frame supported by multiple wheels; a steering system for controlling a direction of travel for the implement by turning one or more of the multiple wheels within a steering range; and a laser configured, to emit a beam in a direction outward from the implement within the steering range.

In another aspect, the present invention may provide a method for providing agricultural operations on an agricultural field using a self-propelled implement having a frame supported by multiple wheels. The method may include: (a) controlling a direction of travel for the implement by turning one or more of the multiple wheels within a steering range; (b) emitting a beam from a laser in a direction, outward from the implement within the steering range, the beam producing a beam or spot on the agricultural field; and (c) turning the one or more wheels to position the beam or spot on the agricultural field.

In yet another aspect, the present invention may provide a self-propelled agricultural sprayer including: a frame supported by multiple wheels; a pair of wing booms pivotably mounted to the frame, the wing booms being configured to spray an agricultural field; an operator cab supported by the frame; a steering system controlled in the operator cab, the steering system for controlling a direction of travel for the sprayer by turning one or more of the multiple wheels within a steering range; a laser configured to emit a beam in a direction outward from the sprayer within the steering range, in which the laser is mounted on the sprayer centrally with respect to the frame in the direction of travel; and a control system in communication with the laser, in which the control system may be operable to adjust at least one of the direction and an intensity of the beam. The direction of the beam may be provided within a field of view provided by the operator cab.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
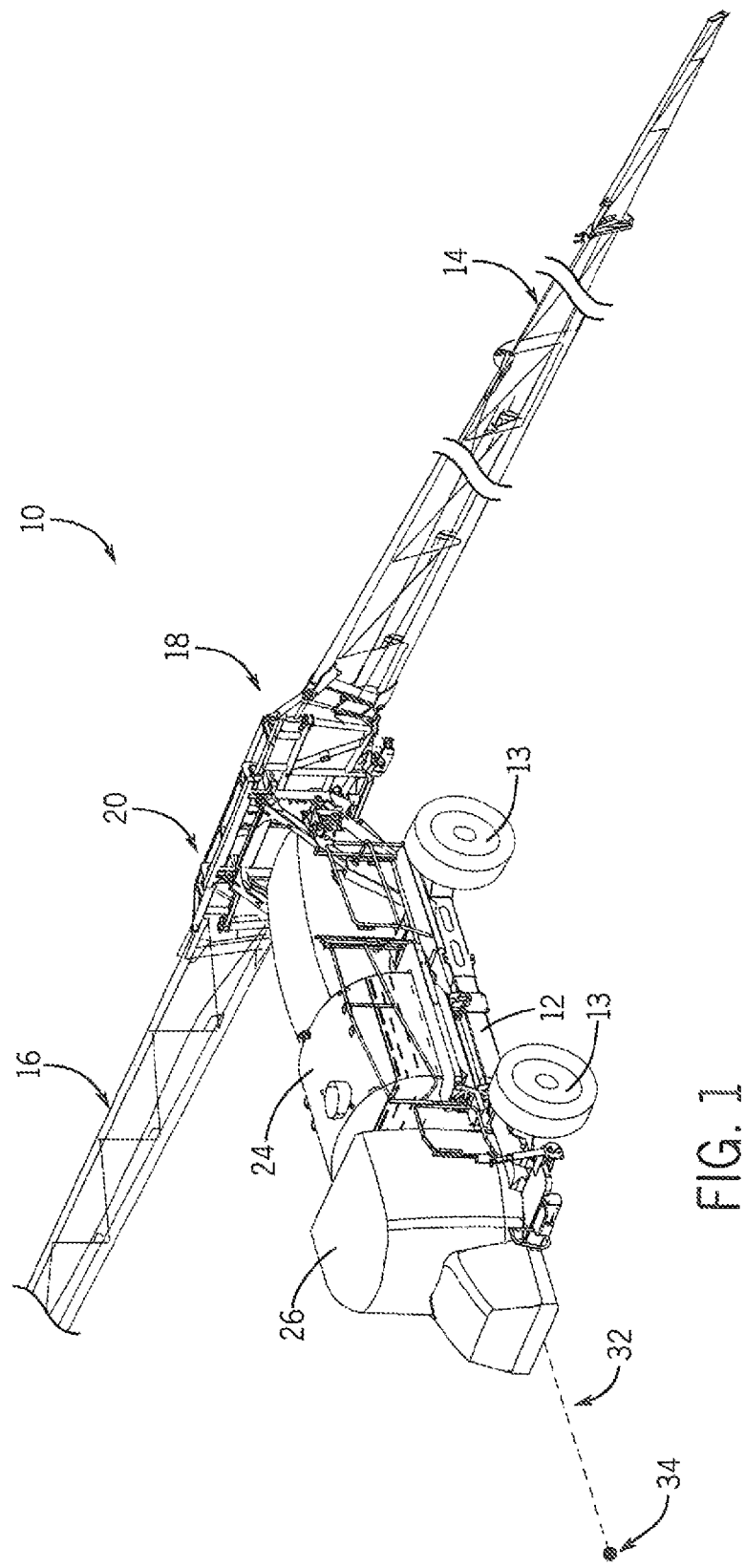
FIG. 1 illustrates an isometric view of an exemplar implement for agricultural operations, shown as a self-propelled agricultural sprayer by way of example, having a laser configured to emit a beam in accordance with an aspect of the present invention.
Figure 2:
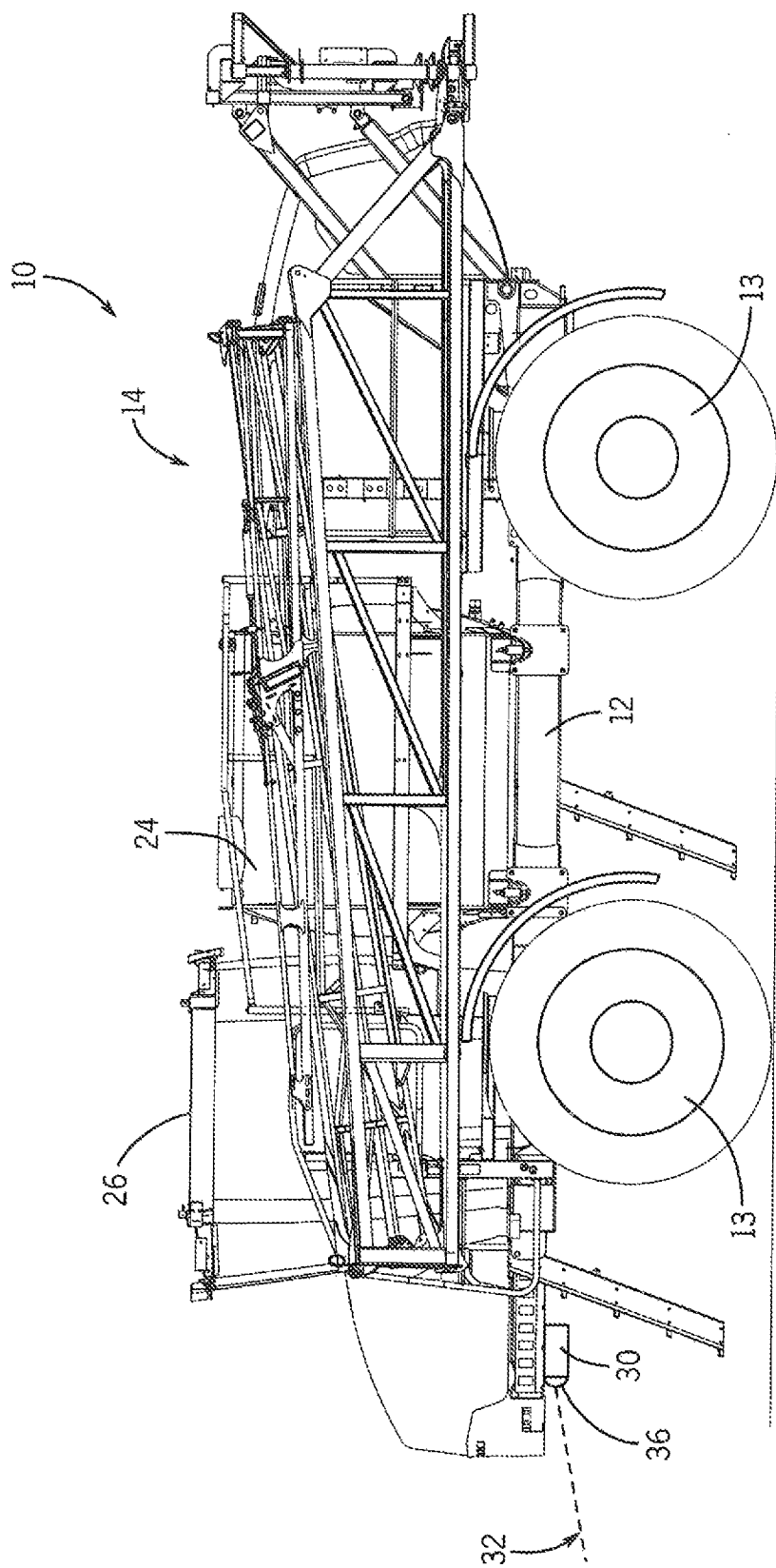
FIG. 2 illustrates a side elevation view of the implement shown in FIG. 1.

Referring generally to the drawings, and more particularly to FIGS. 1 and 2, an exemplar implement 10 for agricultural operations, which in the illustrated embodiment is a self-propelled agricultural sprayer by way of example, is provided in accordance with an aspect of the present invention. While an agricultural sprayer is shown and substantially described, it is understood that the present invention is not limited to an agricultural sprayer and thus may be applicable with other types of machines or implements.

The implement 10 may include a frame 12 supported by wheels 13. For spraying operations, a pair of left and right wing booms 14 and 16, respectively, may be connected to the frame 12. The left and right wing booms 14 and 16, respectively, may be designed to, fold forward toward a leading end of the frame 12 when the wing booms are moved from an extended position, shown in FIG. 1, to a stowed or transport position, shown in FIG. 2 for the left wing boom 14 only. One skilled in the art will appreciate that the right wing boom 1 is stored in a similar manner on an opposite side of the frame.

Each wing boom may support a series of spraying units (not shown) designed to deliver fluid from tank 24, centrally supported on frame 12, onto a farming or planting surface. As noted above, the tank 24 may be positioned generally in the center of the frame 12 between the left and right wing booms 14 and 16, respectively, and an operator cab 26, which may be part of a body supported by the frame 12. The tank 24 may be designed to contain fluid, such as herbicide, insecticide, and fertilizer, which is fed to the spraying units through a series of fluid lines (not shown) as known in the art. As also known in the art, the operator cab 26 contains a control panel (not shown) that has various operator controls for driving, steering and otherwise controlling operation of the implement 10 and its components.

In accordance with an aspect of the invention, a laser guidance system includes a laser 30 may be mounted to the implement 10. The laser 30 may be configured to emit a beam 32 in a direction outward from the implement within a steering range of the implement so that a spot 34 or beam which may be produced by the laser 30 onto an agricultural field may be visible to an equipment operator in the operator cab 26. The laser 30 may emit the beam 32 through an adjustable lens 36 to maximize brightness and focus of the spot 34 as placed by the equipment operator in the operator cab 26. The laser 30 may be operable to emit a first beam color, such as green, which may be ideal for bright ambient lighting conditions, and/or a second beam color, such as red, which may provide better contrast in certain conditions, by switching between laser light sources in the laser 30. In one aspect, the lens 36 may be a lens suitable for producing a continuous beam (or line) along the surface of the ground, such as a cylindrical lens or a Powell lens.

The laser 30 may also include external mounting supports and a protective housing sufficient to protect the laser 30 from environmental conditions when mounted to implement 10. In one aspect, the laser 30 may be mounted to a forward area of the frame 12, underneath the implement 10, which may be forward of the wheels 13 for steering the implement 10.

Figure 3:
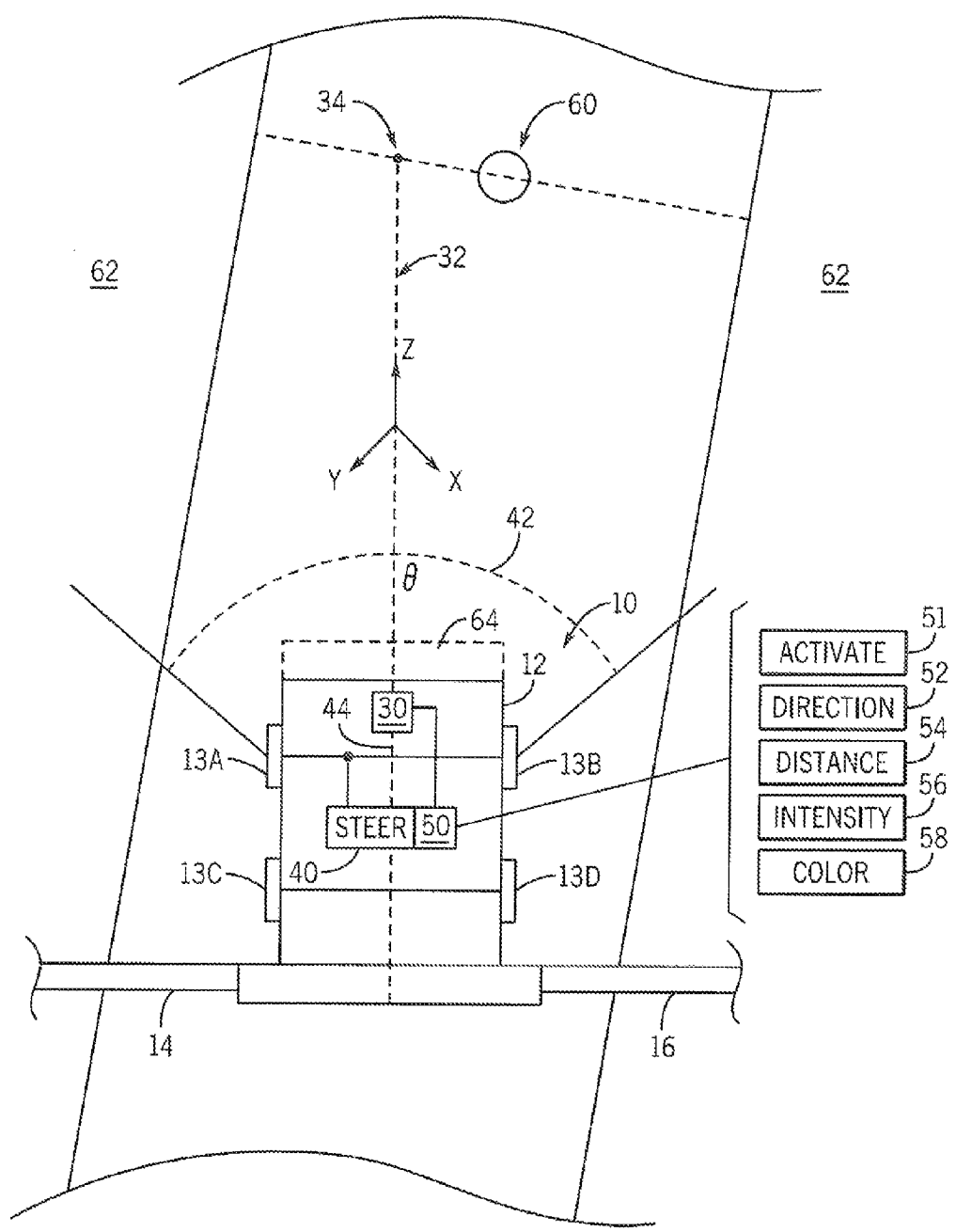
FIG. 3 illustrates a diagram for an implement which may turn one or more wheels to position a beam or spot produced by a laser on an agricultural field in accordance with an aspect of the present invention.

Referring now to FIG. 3, a diagram for the implement 10 which may turn wheels 13 to position the spot 34 or beam produced by the laser 30 onto an agricultural field is provided in accordance with an aspect of the invention. A steering system 40 for the implement 10 may include left and right forward wheels 13a and 13b, respectively, which may control a direction of travel for the implement 10 by turning (or steering) the left and right forward wheels 13a and 13b, respectively, within a steering range 42 defined by an angle θ. The steering system 40 may be controlled by an equipment operator steering in the operator cab 26 as understood in the art. The laser 30 may be configured to emit the beam 32 in a direction outward from the implement within the steering range 42. The beam 32 may be emitted to produce a single spot 34 on the agricultural field, or alternatively, the beam 32 could be emitted to produce a continuous straight line along the surface of the agricultural field, such as between the implement 10 (establishing a first point) and the spot 32 (establishing a second point).

In one aspect, the laser may be, mounted on the implement 10 along a central axis 44 with respect to the frame 12 in a direction of travel. In addition, the laser 30 may be mounted on the implement 10 forward of the left and right forward wheels 13a and 13b, respectively, for steering the implement 10 so that the equipment operator may guide the left and right forward wheels 13a and 13b, respectively, in the proper direction.

A control system 50, controlled by the equipment operator in the operator cab 26, is in communication with the laser guidance system such as the laser 30 for controlling the laser 30. The control system 50 may be operable to allow the equipment operator to adjust the direction 52 of the beam 32, such as in a horizontal (x-y) direction, for optimal placement with respect to orientation of the implement 10. The control system 50 may also be operable to allow the equipment operator to adjust the distance 54 of the spot 34 on the ground, such as by adjustment of the laser 30 in a vertical (z) direction, for optimal placement of the spot 34 or beam with respect to a target 60, which may be a desired center on the field identified by the equipment operator. These adjustments may be done by controlling actuators that operably connect the laser 30 to the implement 10 by way of control system 50. The control system 50 may also be operable to allow the equipment operator to adjust the intensity 56 of the spot 34 or beam on the ground, such as by adjusting brightness of the laser 30. The control system 50 may also be operable to allow the equipment operator to adjust the color 58 of the laser 30, for example, green or red, such as by selection of among multiple lasers in the laser system.

In one example, the implement 10 may be a self-propelled agricultural sprayer with left and right wing booms 14 and 16, respectively. An equipment operator may steer the sprayer from the operator cab 26 to control a direction of travel for the sprayer by turning the left and right forward wheels 13a and 13b, respectively, within the steering range 42. The equipment operator may activate 51 the laser 30 from the control system 50 to emit the beam 32 outward from the sprayer within the steering range 42, within a field of view provided by the operator cab 26. The beam 32, in turn, may produce the spot 34 or beam on the agricultural field as the equipment operator drives the sprayer between crop rows 62. The equipment operator may then turn left and right forward wheels 13a and 13b, respectively, to position the spot 34 or beam at a center between the crop rows 62, which the equipment operator may identify as the target 60. The equipment operator may then activate sprayer units of the left and right wing booms 14 and 16, respectively, to efficiently spray the agricultural field.

In another example, the implement 10 may be a self-propelled agricultural vehicle having a baler 64 mounted to the frame 12. In this case, the equipment operator may activate 51 the laser 30 and turn the left and right forward wheels 13a and 13b, respectively, to position the spot 34 or beam at a center of a crop along a windrow. The agricultural vehicle may then proceed to process the crop using the baler 64, while turning the left and right forward wheels 13a and 13b, respectively, to maintain a position of the spot 34 or beam at a center of the windrow. It will be appreciated that numerous farming operations may be accomplished with increased speed in efficiency according to aspects of the inventions. Alternative, aspects may also include, for example, four wheel steering. Such variations are within the scope of the invention.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An implement for agricultural operations having a laser guidance system, the implement comprising:
    a frame supported by a plurality of wheels;
    a steering system for controlling a direction of travel for the implement by turning one or more of the plurality of wheels within a steering range; and
    a laser assembly configured to selectively emit a beam having one of a first beam color and a second beam color in a direction outward from the implement within the steering range, the laser assembly including a first laser light source operable to emit the beam having the first beam color and a second laser light source operable to emit the beam having the second beam color.

2. The implement of claim 1, wherein the laser assembly is mounted on the implement centrally with respect to the frame in a direction of travel.

3. The implement of claim 2, wherein the laser assembly is mounted on the implement forward of the one or more wheels for steering.

4. The implement of claim 1, further comprising a control system in communication with the laser assembly, wherein the control system is operable to adjust the direction of the beam.

5. The implement of claim 1, further comprising a control system in communication with the laser assembly, wherein the control system is operable to adjust an intensity of the beam.

6. The implement of claim 1, further comprising a pair of wing booms pivotably mounted to the frame, wherein the wing booms are configured for spraying an agricultural field.

7. The implement of claim 1, further comprising a baler mounted to the frame, wherein the baler is configured to process a crop from an agricultural field.

8. The implement of claim 1, further comprising an operator cab supported by the frame, wherein the direction of the beam is provided within a field of view provided by the operator cab.

9. A method for providing agricultural operations on an agricultural field using a self-propelled implement having a frame supported by a plurality of wheels and a laser guidance system, the laser guidance system emitting a beam and including a first laser light source operable to emit the beam with a first beam color and a second laser light source operable to emit the beam with a second beam color, the method comprising:
    (a) controlling a direction of travel for the implement by turning one or more of the plurality of wheels within a steering range;
    (b) selecting one of the first laser light source and the second laser light source to emit the beam from the laser guidance system;
    (c) emitting the beam from a laser in a direction outward from the implement within the steering range, the beam producing a spot or beam on the agricultural field; and
    (d) turning the one or more wheels to position the spot or beam on the agricultural field.

10. The method of claim 9, further comprising adjusting the direction of the beam.

11. The method of claim 9, further comprising adjusting an intensity of the beam.

12. The method of claim 9, wherein the self-propelled implement includes wing booms pivotably mounted to the frame, and further comprising centering the spot or beam between crop rows while spraying the agricultural field with the wing booms.

13. The method of claim 9, wherein the self-propelled implement includes a baler mounted to the frame, and further comprising centering the spot or beam on a crop for processing by the baler.

14. The method of claim 9, wherein the self-propelled implement includes an operator cab supported by the frame, and further comprising providing the direction of the beam within a field of view provided by the operator cab.

15. The method of claim 9, wherein the laser is mounted on the implement centrally with respect to the frame in a direction of travel and forward of the one or more wheels for steering.

16. A self-propelled agricultural sprayer with a laser guidance system, the self-propelled agricultural sprayer comprising:
    a frame supported by a plurality of wheels;
    a pair of wing booms pivotably mounted to the frame, the wing booms being configured to spray an agricultural field;
    an operator cab supported by the frame;
    a steering system controlled in the operator cab, the steering system for controlling a direction of travel for the sprayer by turning one or more of the plurality of wheels within a steering range;
    a laser configured to emit a beam in a direction outward from the sprayer within the steering range and including a first laser light source operable to emit the beam with a first beam color and a second laser light source operable to emit the beam with a second beam color, wherein the laser is mounted on the sprayer centrally with respect to the frame in the direction of travel; and
    a control system in communication with the laser, the control system being operable to select-one of the first laser light source ad the second laser light source to emit the beam from the laser and being operable to adjust at least one of the direction and an intensity of the beam,
    wherein the direction of the beam is provided within a field of view provided by the operator cab.

17. The sprayer of claim 16, wherein the laser is mounted on the sprayer forward of the one or more wheels for steering.

* * * * *